Figure 1:
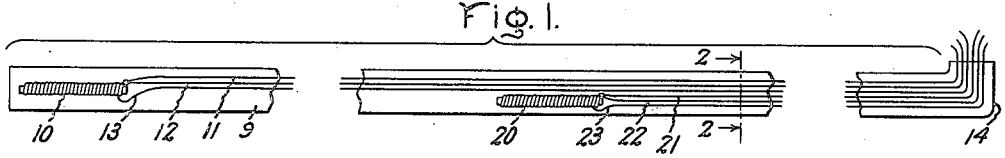

Nov. 25, 1952 — E. S. DAWSON, JR — 2,619,573
TEMPERATURE DETECTOR AND LEAD ASSEMBLY CONSTRUCTION
Filed Jan. 30, 1952

Inventor:
Edward S. Dawson Jr.,
by Richard E. Hosley
His Attorney

Patented Nov. 25, 1952

2,619,573

UNITED STATES PATENT OFFICE 2,619,573

TEMPERATURE DETECTOR AND LEAD ASSEMBLY CONSTRUCTION

Edward S. Dawson, Jr., Scotia, N. Y., assignor to General Electric Company, a corporation of New York Application January 30, 1952, Serial No. 269,086

3 Claims. (Cl. 201—63)

My invention relates to temperature detectors and lead assemblies and to methods of making the same and has particular significance in connection with improvements in temperature detectors useful in winding slots of large generators in which it is extremely important to assure that the various parts of the winding will at all times be maintained below a predetermined temperature.

In practicing the pyrometry art, it has long been known to use electric signal means for providing temperature indication. Thus, temperature may be measured by changes in electrical resistance of a detector conductor, or temperature may be measured as a function of minute voltages generated between the dissimilar metals of a thermocouple detector. Heretofore, insulated assemblies of detectors of either type have, for certain applications, had serious disadvantages of low mechanical strength, poor thermal endurance properties and low dielectric strength which become particularly disadvantageous when the detector is located adjacent a high voltage winding as in an electric machine winding slot.

It is an object of the present invention to provide simple and inexpensive means for overcoming the above-mentioned difficulties.

A further object of the present invention is to provide a detector and lead insulated assembly characterized by high mechanical strength, high thermal endurance and having good dielectric properties as well as adequate protection against moisture.

Heretofore temperature detectors for use in the winding slots of large rotating apparatus have comprised a detector probe enclosed in various insulations all of which may be classed as unsatisfactory in view of some present-day requirements. A separately but similarly insulated extension has been used to carry the leads out of the slot with a mechanically and electrically weak or bulky taped joint between the two units. In accordance with the illustrated embodiment of the present invention, I eliminate the mechanical, thermal and electrical weaknesses of such constructions by sandwiching the detector probe and the entire length of its leads up to any desired point (for example, through the "slot portion") between cloth material layers which have been impregnated, and thereafter cured, with an unsaturated polyester resin and then "dusted" with a similar but uncured resin, e. g., with a polymerizable material such as that known by the trade names of Con-olite, or Permafil or Laminac. The interlaminar surfaces are "dusted" with a similar but uncured resin and the assembly is then sealed under pressure after which the completed detector and lead insulated assembly, compared to all prior art assemblies known to me, is characterized by a higher breakdown voltage, improved mechanical properties and lower cost and greater ease of manufacture.

Figure 2:
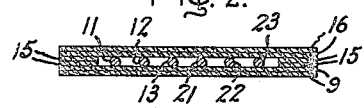
Figure 3:
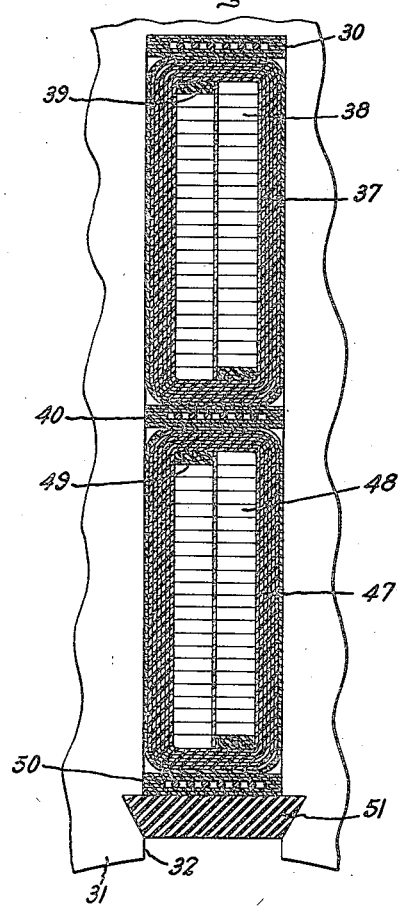

The features of my invention which I believe to be novel are set forth in the appended claims. My invention itself, however, both as to organization and method of operation, together with further objects and advantages thereof, may best be understood by reference to the following description taken in connection with the accompanying drawing in which Fig. 1 is a plan view of a portion of a resistance temperature detector and lead assembly during one step of its manufacture; Fig. 2 is a cross-sectional view of the completed assembly; and Fig. 3 is a cross-sectional view of a dynamoelectric machine stator core portion having a winding slot assembly incorporating detector assemblies similar to the detector assembly of Figs. 1 and 2.

Referring now to the drawings and particularly to Figs. 1 and 2, as a first step in making the improved arrangement of the invention, I provide one or more base strips 9, of which two are shown in Fig. 2. These strips may be cut to the right width and length as from a sanded smooth cured sheet of unsaturated resin treated glass cloth, the length being sufficient, for example, to occupy a major portion of the length of a dynamoelectric machine core winding slot, and the width being sufficient to occupy substantially the entire width of the slot as hereinafter explained in connection with Fig. 3. Thus as indicated in Fig. 1, the width may be 1$\tfrac{1}{32}$" and the overall length may be 10′5″. The unsaturated polyester resins employed in the practice of the present invention comprise, for instance, mixtures of (1) a polyhydric alcohol ester of an alpha unsaturated alpha, beta dicarboxylic acid or anhydride, e. g., diethylene glycol maleate, and (2) an unsaturated copolymerizable compound or mixture of compounds, e. g., diallyl phthalate or styrene or mixtures of such materials, and (3) a cure accelerator for the aforementioned copolymerizable materials, the catalyst being, for example, benzoyl peroxide.

Such strips 9 are laid flat (as on a bench) and on the top is placed one or more detector probes such as the resistance detector coils 10 and 20 of Fig. 1. In accordance with conventional practice, the resistance temperature detectors may each be provided with three leads, two of which are joined to a common terminal of the detector. Thus, in Fig. 1 wires 11 and 12 are connected to one terminal of detector 10 and serve as compensating wires, balancing the resistance of each other by their connection into a measuring instrument circuit (not shown) and the third wire 13 may be thought of as supplying current to the detector. It will be noticed that these wires pass along one side of the detector 20 which is provided with additional, but similar, leads 21, 22, and 23. All of the leads are shown terminating in a right angle take off at 14, the latter feature being optional. They can of course be brought out at any desired angle and then attached, for example, to an armored cable (not shown) which might be fed through pipes on the machine frame to bring the leads out to a terminal board.

It is to be understood that Fig. 1 shows only a primary step of the assembly procedure, with the detectors placed upon the base strip and before additional strips are placed over and around the detector to complete the assembly.

As a next step the uppermost surface of the base strip is brushed or dusted with a small amount of resin material similar in nature to that mentioned above except uncured, and then shim strips 15, see Fig. 2, are placed along the edges to keep direct pressure from the detectors and leads. Shim strips 15 may be of the same cured unsaturated polyester resin treated material and they are also "dusted," at least on their top sides. Later a top strip or strips 16 of the same or similar treated cloth material is applied with light pressure and in a few minutes the assembly will have set to a hard bond, permitting subsequent handling of the coil and its insertion into the winding slot, hereinafter described in connection with Fig. 3. If two base strips or two top strips are used as shown, one of the pair will have its mating surface brushes with curable catalyzed resin, e. g., one of the unsaturated polyester resins plus a catalyst acting as an adhesive curable at room temperature (or above), unless it happens that the cloth impregnate is of itself uncured but curable.

Referring now to Fig. 3, 31 represents a portion of a dynamoelectric machine stator core of magnetic material (usually iron punchings) provided with a winding slot 32 in which there is shown a "bottom of slot" resistance temperature detector and lead assembly 30, a "bottom" coil side (comprising outer insulation 37, transposed conductor bars 38, and transposing space insulation 39); a "middle of the slot" resistance temperature detector and lead asesmbly 40, a "top" coil side (comprising insulation 47, transposed bars 48 and transposing space insulation 49); and there is also an "air gap" resistance temperature detector and lead assembly 50, with all of the detectors and coil sides held in the slot by a conventional slot wedge 51.

Each of the detectors and lead assemblies 30, 40 and 50 are presumed to have been made in the manner and of the materails already specified so that each of the assemblies comprises a unitary structure, easy and safe to handle with no weak extension joint, no portion with substantially lower than overall dielectric strength and with the entire assembly inert to all common solvents and gases. There is thus provided a lower cost and improved quality coil and lead assembly which may be readily tailored to each job requirement by an easy and fast fabricating technique.

While I have illustrated and described my invention in connection with resistance temperature detectors, it will be obvious that the same principles apply and the invention is equally applicable to detectors of other types, for example, of the thermocouple type. Other modifications will also occur to those skilled in the art and I desire it to be understood, therefore, that my invention is not to be limited to the particular arrangement disclosed, and I intend in the appended claims to cover all modifications which do not depart from the true spirit and scope of my invention.

What I claim as new and desire to secure by Letters Patent of the United States is:

1. In a temperature detector and lead assembly, the combination of a detector, a plurality of detector leads, and a unitary insulation covering for said detector and said leads and comprising bonded layers of unsaturated polyester resin treated cloth material between which said detector and lead assembly is sandwiched.

2. In a temperature detector and lead assembly, the combination of a temperature detector having a plurality of leads, layers of impregnated glass cloth material extending on opposite sides of said detector and leads, shim strips of similar impregnated material extending between said layers outside of said detector and leads, and an unsaturated polyester resin polymerized in place to act as an adhesive between said layers and said shim strips to form a unitary structure.

3. The method of manufacture of a temperature detector and lead assembly, comprising the steps of providing at least one base layer of unsaturated polyester resin treated glass cloth material, providing a detector and leads connected thereto and placing said detector and leads on said base layer, providing shim strips of unsaturated polyester resin treated glass cloth material and placing said shim strips on said base layer adjacent said detector and leads and on opposite sides thereof, providing a top strip of unsaturated polyester resin treated glass cloth material, and placing said top strip over said shims, said detector and said leads and applying pressure to said assembly.

EDWARD S. DAWSON, Jr.

No references cited.